W. M. McEWEN.
TIRE CASING FILLER.
APPLICATION FILED MAR. 11, 1920.
1,389,005.
Patented Aug. 30, 1921.
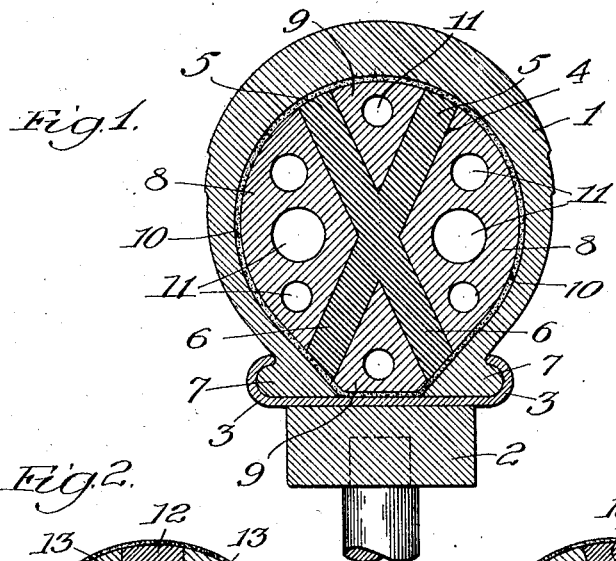
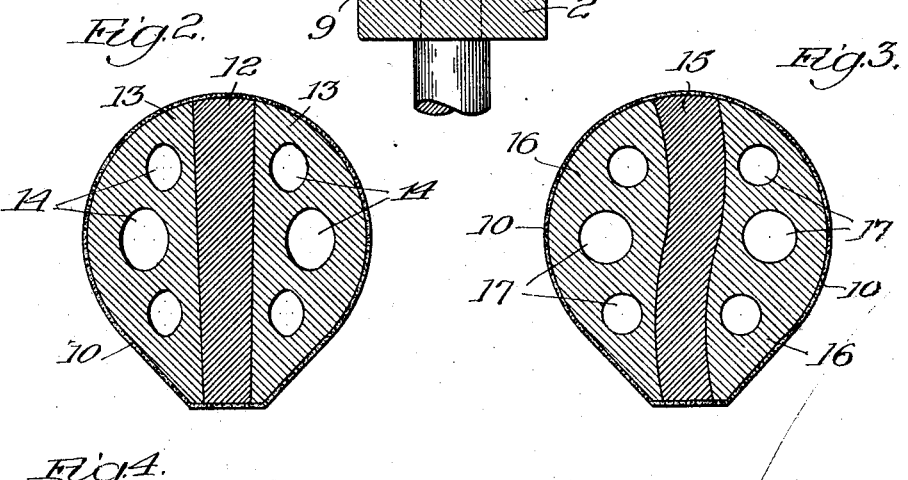
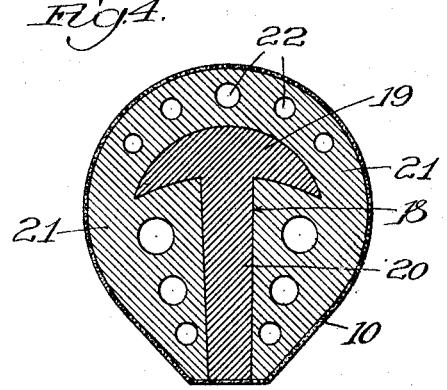
Inventor.
Willard M. McEwen,

UNITED STATES PATENT OFFICE.

WILLARD M. McEWEN, OF CHICAGO, ILLINOIS.

TIRE-CASING FILLER.

1,389,005.  Specification of Letters Patent.  Patented Aug. 30, 1921.

Application filed March 11, 1920. Serial No. 364,883.

*To all whom it may concern:*

Be it known that I, WILLARD M. MCEWEN, a citizen of the United States, residing at Chicago, in the county of Cook and State of Illinois, have invented new and useful Improvements in Tire-Casing Fillers, of which the following is a specification.

This invention relates to tire fillers for use in outer casings or shoes of pneumatic tires as reliable substitutes for pneumatic inner tubes heretofore employed with such casings.

Among the objects of my invention is to improve the construction of tire fillers in the several particulars as will hereinafter more fully appear, and to provide in particular a tire filler embodying a plurality of solid rubber portions of different resiliencies, extending longitudinally of the filler and arranged with the portions of less resiliency to support the normal load on the tire, and with the more resilient solid rubber portion or portions arranged for absorbing the shocks and jars to which the filler and the tire casing are subjected when in use, as while traveling over a roadway, and to hold the first mentioned solid rubber portion in load-supporting position, the solid rubber portions of the filler being vulcanized or otherwise secured together to prevent such portions from movement with respect to each other along their contacting surfaces and thus avoid friction being produced between the parts when compressed or flexed while in use.

In the accompanying drawings—

Figure 1 is a transverse cross-sectional view showing one form of tire filler of my invention inserted in an outer casing or shoe of a so-called pneumatic tire and employed in place of the pneumatic inner tube heretofore used with such tire; and Figs. 2 to 4, inclusive, are cross-sectional views illustrating, respectively, other forms of tire fillers of my invention, each differing from the others and the one in Fig. 1 in the manner shown.

The tire filler of my invention, no matter what form it may take, is inserted or located in the outer casing or shoe of a pneumatic tire as now in common use, and is designed to supplant the pneumatic inner tube heretofore used with such tires. The tire filler serves to overcome all of the disadvantages incident to the use of pneumatic inner tubes, in that it avoids punctures, blow-outs, and the like, yet possesses such resilient properties to be a reliable substitute for such inner tubes.

In Fig. 1 of the drawings, I have shown one form of my improved tire filler, and, as shown, it is inserted in and completely fills the outer casing or shoe 1 of a pneumatic tire, whether of the clencher type as used on motor vehicles, such as trucks, automobiles and the like, or of the circular type as employed on bicycles or other lighter vehicles. For the purposes of illustration, I have shown, in Fig. 1, my filler as used with a tire of the clencher type, and, as shown the outer casing or shoe 1 is detachably secured to the felly 2 of a vehicle wheel by a clencher rim 3 of a common form. The tire filler comprises a plurality of solid rubber portions of different resiliencies, one portion 4 being the main one, centrally arranged and extending longitudinally of the filler, or circumferentially about the tire-casing. The portion 4 is made substantially X-shape in cross-section, and thus has two pairs of diverging arms 5, 5 and 6, 6, which merge together at the center of said member. This member 4 is so arranged that, when the filler is inserted into the outer casing 1 in proper position, the arms 5, 5 extend outward and span that portion of the inner surface of the outer casing or shoe directly beneath the tread surface of the tire. The other set of arms 6, 6 extend inward and bear against the inside of the casing 1 at the clencher beads 7, 7 and in a direction to hold them in the clencher channels of the rim 3. The member 4 is made of solid rubber of such grade that, while it possesses sufficient elasticity to yield under and readily respond to the shocks and jars to which the tire is subjected while in use, yet it has sufficient strength to support the normal load on the tire.

To hold the member 4 in its load supporting position, and to restore it to that position after being compressed or flexed by the shocks and jars to which it is subjected when the tire is in use, as in the travel over a roadway, there are, on opposite sides of said member 4, more resilient solid rubber portions 8, 8, and in the spaces between the arms 5, 6 there are like solid rubber portions 9. These portions 8, 9 extend longitudinally of the filler and have the shape required to completely fill the spaces in which they are located, and have their outer surfaces so shaped that they complete and define the outer surface of the filler and make it accord to the interior shape of the tire casing 1, as shown. These portions 8, 9 are secured to the member 4 by vulcanization or otherwise so that the filler becomes one integral part. Thus, the several parts have no movement with respect to each other along their contacting surfaces, with the result that no friction is produced as the parts flex or yield in service, and thus no heating of the filler takes place to impair its effective and efficient action. The filler is incased in a fabric cover 10 to keep the parts under a slight initial compression and to hold the parts to the shape and size required for insertion in the tire-casing.

To enable the softer solid rubber portions 8 and 9 to readily yield to an extent sufficient to absorb shocks and jars, said portions are each provided with one or more holes or passages 11 extending longitudinally through the same. These holes may be of the number desired and be given any shape found most advisable, yet they are spaced apart sufficient distances to prevent the solid rubber between them from breaking or cracking in the expansion and contraction to which the parts are subjected when in use. The holes are made circular in shape in the form of filler shown in Fig. 1, although any other shape could be used, and by reason of the holes the portions may compress more than would be permitted by the spaces in which they are confined if no such holes were provided.

The main solid rubber portion 4 supports the normal load on the tire, this being aided by the surrounding softer rubber portions 8 and 9, which act to resist the tendency of the main member 4 to be compressed or flexed under a normal load. When the tire is subjected to a shock or jar in traveling over a roadway, the shock being in excess of the normal load acts to compress the main member 4, which yields under such load, and, in being braced by the softer rubber portions 8 and 9, these portions yield and the shocks transmitted to these softer rubber portions are absorbed and dissipated thereby before reaching the felly 2 of the wheel. Thus, the shocks are taken up in the tire and are not translated to the body of the car or vehicle through the wheel. When the main member 4 is compressed or flexed, the softer rubber portions 8 and 9 will yield therewith, this being permitted to a marked degree by the openings or passages 11. As one softer rubber portion is tied to another through the main member 4, it follows that, when one softer rubber portion is compressed by the action thereon of the main member 4, the softer rubber portions on the opposite side of the main member 4 will be expanded and drawn in the direction of the force applied in compressing the other softer rubber portion. As these portions are tied, the expansion of one will tend to resist the compression of the other and, when the force is relieved, the softer rubber portions will act quickly to restore themselves to their original non-flexed condition and thus return the member 4 to its initial load-supporting position. The softer rubber portions possessing a greater degree of resiliency than the main member 4, there is a quick action in this respect, so that the tire will quickly resume its normal shape, with the result that the tire will have a livelier action and will consume less power. By having the parts vulcanized together, the force of the shock or vibration is divided and diffused into the softer rubber portions which are better conductors of vibration than the harder rubber member 4. The softer rubber portions 8 and 9 being substantially solid, makes them better conductors of vibration, as the holes 11 therein are not sufficient in number to interfere with the diffusion of vibration. The holes 11 permit said portions to be compressed or flexed and thus increase the elasticity thereof, with the result that such portions will not crush down and become dead. By having the hard rubber member beneath the tread portion of the tire and extending circumferentially about the same, the compression will be more even and will be extended along the circumference of the tire in advance of the point of contact of the tire with the roadway. This results in allowing the compression to be continually in advance of the point of contact, and thus a sloping surface is gained, permitting the tire to roll evenly over the roadway without at any time producing any abrupt shoulders in advance of the point of contact, which would increase the vibrations and shocks to which the tire would be subjected when in use. In other words, with a substantially solid rubber portion extending circumferentially beneath the tread surface of the tire, there is no likelihood of a flat tire being produced.

In Fig. 2, I have shown another form of my invention. As shown, the filler comprises a main solid rubber portion or member 12 having a substantially uniform width throughout its height and length and forming in effect a radial post or ring under the tread surface of the tire. On opposite sides of said main member 12 are softer solid rubber portions 13, 13, vulcanized to the main member to make the filler a one-piece structure, as before. These portions 13, 13 are each provided with a plurality of openings or passages 14, 14, which, like the ones before, extend longitudinally of the filler, but, instead of being circular, are elliptical, as shown.

In Fig. 3, I have shown still another form of my invention. This form differs from the one shown in Fig. 2 only in the fact that the main solid rubber portion 15 is curved to some extent vertically, when made initially. It is maintained in such position normally by softer solid rubber portions 16, 16 on opposite sides thereof and vulcanized thereto, as before. These portions 16 are also provided with passages or holes 17, as before.

In Fig. 4, I have shown still another form of my invention. In that figure I have shown the main solid rubber member 18 somewhat T-shape in cross-section, with the head 19 extending to a considerable extent over and beyond the tread surface of the tire and integrally connected with a stem portion 20, which bears against the rim 3 between the clencher beads of the outer casing. Completely surrounding this member 18 is a softer rubber section 21, which has portions on opposite sides of the stem 22 and a portion extending about the head 19 and between the same and the inner surface of the casing under the tread surface of the tire. This softer rubber section 21 is also provided with a plurality of holes or passages 22 arranged substantially in the manner shown.

In all of the forms shown in Figs. 2 to 4, the filler is incased in a fabric cover 10. Moreover, in all of such forms, the main member supports the normal load on the structure, and the more resilient solid rubber portions serve the same purpose as like parts in Fig. 1. The tire is given a livelier action, as the softer rubber portions restore the tire to its normal shape as the weight thereon is released, and being made of solid rubber, these portions will compress more evenly because of the holes following the curve of the tire, and permitting the compression to extend farther along the circumference of the tire. Furthermore, by direct pressure from above, the parts will compress less, comparatively, because the force is exerted directly in a line vertically where the structure of the tire permits the greatest resistance. Again, the parts being secured together and of solid rubber, heating is avoided, as there are no parts to move against each other to produce friction.

While I have shown and described herein my invention as embodied in a filler separate from the outer casing or shoe, it is to be understood that the structure could be made in the form of a tire, as by making it a permanent part of the casing or shoe. Furthermore, while I have shown and described in detail various forms of my invention, it is to be furthermore understood that the details of construction could be changed and modified without departing from the spirit and scope of my invention.

I claim as my invention:

1. A tire-casing filler conforming substantially to the interior shape of the tire-casing, and comprising a main resilient solid rubber portion extending longitudinally of the filler and arranged centrally and vertically of the filler and having a total cross-sectional area sufficienet and being stiff enough to support the normal load on the tire, and more resilient solid rubber portions on opposite sides of the main solid rubber portion and being in direct contact with the sides thereof and vulcanized thereto for supporting said main solid rubber portion in proper load-supporting position.

2. A tire-casing filler conforming substantially to the interior shape of the tire-casing, and comprising a main resilient solid rubber portion extending longitudinally of the filler and arranged centrally and vertically of the filler and having a total cross-sectional area sufficient and being stiff enough to support the normal load on the tire, said main solid rubber portion having straight, smooth side faces, and more resilient solid rubber portions on opposite sides of said main solid rubber portion and in direct contact with the side faces thereof and vulcanized thereto, for supporting the main solid rubber portion in proper load-supporting position.

3. A tire-casing filler conforming substantially to the interior shape of the tire-casing, and comprising a main resilient solid rubber portion extending longitudinally of the filler and arranged centrally and vertically of the filler and having a total cross-sectional area sufficient and being stiff enough to support the normal load on the tire, said main solid rubber portion having a substantially uniform thickness throughout its height and having substantially straight, smooth side faces, and more resilient solid rubber portions on opposite sides of the main solid rubber portion and being in direct contact with the sides thereof and vulcanized thereto for supporting said main solid rubber portion in proper load-supporting position.

4. A tire-casing filler conforming substantially to the interior shape of the tire-casing, and comprising a main resilient solid rubber portion extending longitudinally of the filler and arranged centrally and vertically of the filler and having a total cross-sectional area sufficient and being stiff enough to support the normal load on the tire, said main solid rubber portion having a substantially uniform thickness throughout its height and having substantially straight, smooth side faces, and more resilient solid rubber portions on opposite sides of the main solid rubber portion and being in direct contact with the sides thereof and vulcanized thereto for supporting said main solid rubber portion in proper load-supporting position, said filler being inclosed in a retaining casing and inserted into the tire-casing under pressure.

5. A tire-casing filler conforming substantially to the interior shape of the tire-casing, and comprising a main resilient solid rubber portion extending longitudinally of the filler and arranged centrally and vertically of the filler and having a total cross-sectional area sufficient to support the normal load on the tire, and more resilient solid rubber portions on opposite sides of the main solid rubber portion and being in direct contact with the sides thereof and vulcanized thereto for supporting said main solid rubber portion in proper load-supporting position, at least one of the side solid rubber portions having at least one hole therein extending longitudinally of the same.

In testimony that I claim the foregoing as my invention, I affix my signature, this 8th day of March, A. D. 1920.

WILLARD M. McEWEN.